R. P. ELLIOTT.
FIXTURE USED IN THE MANUFACTURE OF PISTON RINGS.
APPLICATION FILED FEB. 27, 1918.

1,292,735. Patented Jan. 28, 1919.

Inventor:
Richard P. Elliott

UNITED STATES PATENT OFFICE.

RICHARD P. ELLIOTT, OF LEXINGTON, MASSACHUSETTS.

FIXTURE USED IN THE MANUFACTURE OF PISTON-RINGS.

1,292,735.  Specification of Letters Patent.  Patented Jan. 28, 1919.

Application filed February 27, 1918. Serial No. 219,387.

*To all whom it may concern:*

Be it known that I, RICHARD P. ELLIOTT, a citizen of the United States, residing at Lexington, in the county of Middlesex and State of Massachusetts, have invented a new and useful Improvement in Fixtures Used in the Manufacture of Piston-Rings, of which the following is a specification, reference being had therein to the accompanying drawings.

This invention relates to fixtures for use in machining operations upon the interior of cylindrical collars or rings and more especially to a fixture for holding either one or a plurality of such collars or rings during the machining operation.

One of the objects of my invention is to provide a device for holding either one or more collars, rings, or the like, during a machining operation.

Another object of my invention is to provide a device which may be loaded with either one or a plurality of collars or rings and unloaded rapidly at the end of the machining operation.

Still another object of my invention is to provide a device which may be "self cleaning" when the ring or rings are ejected at the end of the machining operation.

A further object of my invention is to provide a device for attaining the above-mentioned objects which will be accurate in operation and may be cheaply constructed.

Other objects will be in part obvious and in part pointed out hereinafter.

Figure 1:
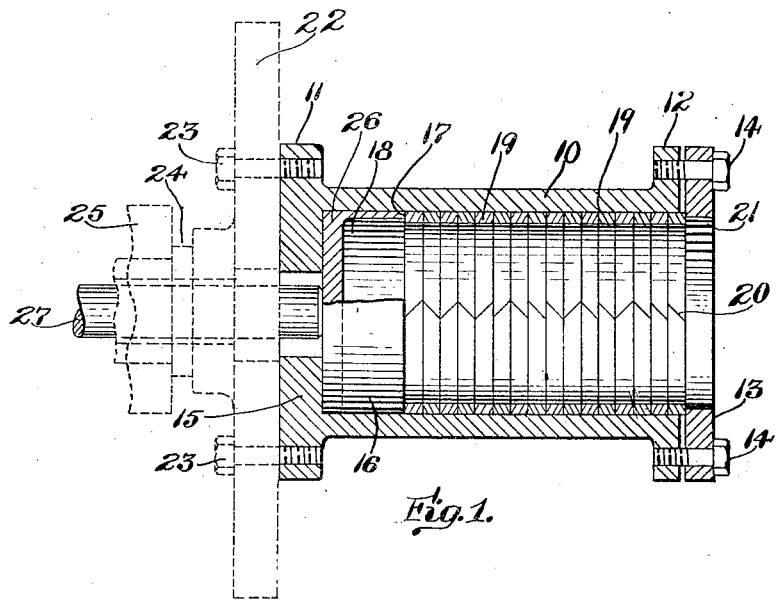
Figure 2:
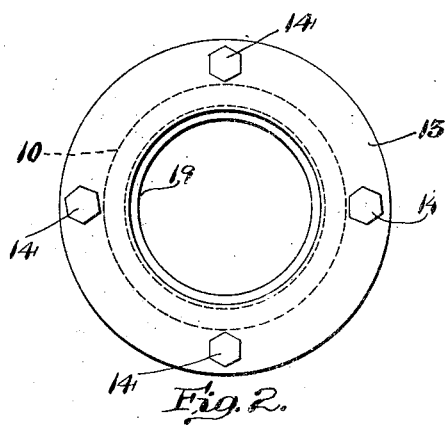

In the accompanying drawings illustrating one embodiment of my invention, Figure 1 is a cross-sectional view of my device; Fig. 2 is an end view looking from right to left in Fig. 1.

Briefly described my invention contemplates a hollow cylindrical member having a clamping member removably secured to one end, and an inwardly projecting shoulder in its interior near its other end. The parts are so arranged that at the end of a machining operation a removable cup-shaped member may be pushed lengthwise of the hollow cylindrical member, carrying with it the collars or rings mounted therein, and all dirt and chips which may have accumulated in the interior of the fixture during the machining operation.

The hollow cylindrical body is represented at 10, Fig. 1, and has flanges 11 and 12 at either end. The clamping member 13 is secured to the flange 12 by means of bolts or screws 14 or in any other suitable manner. A shoulder 15 is formed upon the interior of the cylinder 10 near its inner end. The cup-shaped member 16 is adapted to be inserted in the interior of the member 10 and to impinge against the shoulder 15. The extending edge 17 of the cup-shaped member 16 acts as a stop. The fixture is shown as used to machine piston rings which are represented at 19 and may be contracted or closed in at their slots indicated at 20 and inserted in the interior of the member 10, the first ring being pressed firmly against the extending edge 17 and each succeeding ring pressed firmly against its neighbor until the fixture is loaded. The length of the member 10 may be predetermined so as to allow the last ring to project slightly beyond the edge of the flange 12. The clamping member 13 may now be secured to the body 10 and drawn up firmly by means of screws 14 so as to exert pressure on the rings, thus holding them firmly during a machining operation. The clamping member 13 is provided with a hole 21 slightly larger than the interior of the piston rings, and the cup-shaped member 16 is of substantially the same inside diameter as the hole 21, thus allowing free access to the interior of the rings. The chamber 18 is provided so that a cutting tool or grinding wheel may pass beyond the piston ring adjacent the edge 17 so as to insure said rings being completely finished.

The member 10 may be secured by screws or bolts 23, or in any other suitable manner, to a face plate represented by dotted lines at 22, in Fig. 1. The face plate 22 may in turn be mounted in a hollow spindle 24 running in the bearing 25 of a lathe, grinder or other machine tool.

At the end of the machining operation the clamping member 13 may be removed and a rod 27 inserted through the hollow spindle 24 until it impinges against the rear wall 26 of the cup-shaped stop 16. By pressing upon the rod 27 the rings 19 and cup-shaped member 16 together with all the accumulated dirt and chips will be quickly ejected from the body 10 leaving it clean and ready for reloading.

I have chosen to illustrate my device as adapted for handling a plurality of piston rings, but it is of course, understood, that collars, rings and other hollow cylindrical articles may be held in my device. It should be understood as well that my device is equally adapted to hold rings or collars and the like having either concentric or eccentric inner and outer walls, this being dependent upon the location of the body member 10 with reference to the axis of the spindle 24.

Some of the advantages of my invention may be pointed out as follows: I have provided a device which greatly facilitates the high speed accurate machining of the interior walls of collars or rings and the like; that when the cup-shaped member 16 is moved to eject the piston rings at the end of the machining operation, all of the accumulated dirt and chips are removed and the device may be termed self cleaning. The parts are few and simple; wear is reduced to a minimum and by providing fixtures of suitable inside diameters and lengths a large range of sizes may be economically handled.

I do not wish to be limited to the specific forms of the parts of my invention as illustrated herein but desire to claim it broadly.

What I claim is:—

1. In a device of the character described, in combination, means for supporting piston rings during a machining operation, means for retaining said piston rings in position and means comprising a cup-shaped member for removing said rings after the machining operation is completed.

2. In a device of the character described, in combination, means for supporting piston rings during a machining operation, means comprising an adjustable cap for retaining said piston rings in position and means comprising a cup-shaped member for removing said rings after the machining operation is completed.

3. In a device of the character described, in combination, means for supporting piston rings during a machining operation, means within said supporting means for preventing movement of the rings in one direction and means comprising an adjustable cap for preventing movement of the rings in the opposite direction.

4. In a device of the character described, in combination, a hollow supporting member, a movable stop within said supporting member and means adapted to enter said supporting member to move said stop.

5. In a device of the character described, in combination, means for supporting and holding piston rings during a machining operation and removable means including a cup-shaped member for ejecting said rings and accumulated chips at the end of said machining operation.

6. In a device of the character described, in combination, a hollow cylindrical member adapted to support piston rings during a machining operation, a circular cap removably secured to said supporting member, a removable cup-shaped member adapted to serve as a stop for said rings and further adapted to eject said rings and accumulated chips at the completion of said machining operations, and means for ejecting said cup-shaped member and the rings.

7. In a device of the character described, in combination, a hollow cylindrical member open at one end and provided with an inwardly projecting piston at the other end, said hollow cylindrical member being adapted to support piston rings during a machining operation; a circular cap removably secured to the outer end of said hollow cylindrical supporting member, a removable cup-shaped stop for the piston rings arranged within said supporting member and being adapted to impinge against said shoulder, and means for ejecting the cup-shaped stop and the piston rings at the end of the machining operation.

In witness whereof, I hereunto set my hand this twenty-fifth day of February, 1918.

RICHARD P. ELLIOTT.